Figure 1:
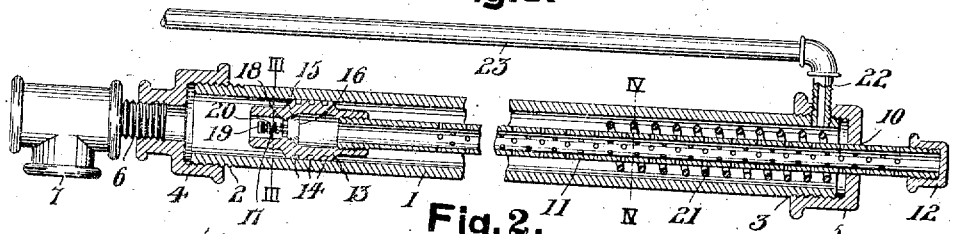

G. BURGESS.

BOILER TUBE CLEANER.

APPLICATION FILED MAR. 27, 1915.

Reissued Aug. 24, 1915.

13,966.

Witnesses

R. H. Hoffman,

G. E. Notes

Inventor

Garrett Burgess

By A. M. Wilson

Attorney

UNITED STATES PATENT OFFICE.

GARRETT BURGESS, OF DETROIT, MICHIGAN, ASSIGNOR TO VULCAN SOOT CLEANER CO., OF PITTSBURG, PA., OF DUBOIS, PENNSYLVANIA, A CORPORATION OF NEW JERSEY.

BOILER-TUBE CLEANER.

13,966. Specification of Reissued Letters Patent. Reissued Aug. 24, 1915.

Original No. 1,128,406, dated February 16, 1915, Serial No. 863,075. Application for reissue filed March 27, 1915. Serial No. 17,570.

*To all whom it may concern:*

Be it known that I, GARRETT BURGESS, a citizen of the United States of America, residing at Detroit, in the county of Wayne and State of Michigan, have invented certain new and useful Improvements in Boiler-Tube Cleaners, of which the following is a specification, reference being had therein to the accompanying drawings.

This invention relates to tube cleaners for boilers, and more particularly to soot cleaners especially adapted for use in cleaning the tubes or flues of vertical boilers.

The primary object of my invention is to provide positive and reliable means, in a manner as hereinafter set forth, for expeditiously subjecting the tubes or flues to the action of steam or other fluid, under pressure, whereby soot, ashes and incrustations are removed from the walls of the flues.

Another object of this invention is not only to remove soot, incrustations, and foreign matter from the tubes or flues of a boiler, but to enable the work to be done while the boiler is steaming or in use and without the necessity of opening any portion of the boiler settings, which opening would allow of the escape of heat and cool off the boiler.

A further object of this invention is to provide a cleaner embodying a reciprocal fluid distributing member adapted to be placed in an operative position by fluid admitted to the cleaner, and retracted by fluid after a cleaning operation.

A still further object of this invention is to provide a simple, durable and inexpensive cleaner that can be advantageously used in connection with a vertical tube boiler, particularly of the Wickes type.

The above and other objects are attained by a mechanical construction that will be hereinafter specifically described and then claimed, and reference will now be had to the drawing wherein:—

Figure 2:
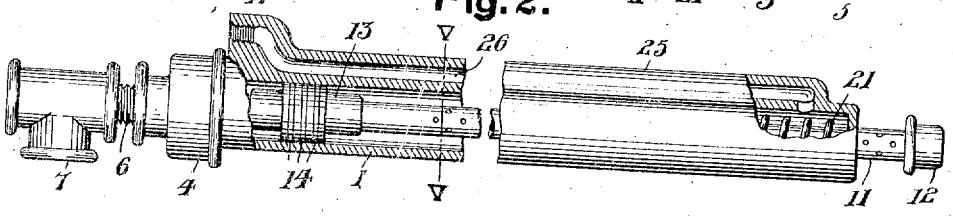
Figure 3:
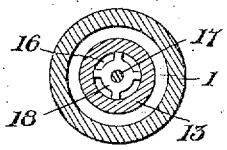
Figure 4:
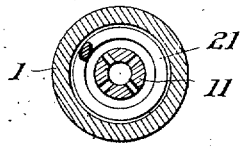
Figure 6:
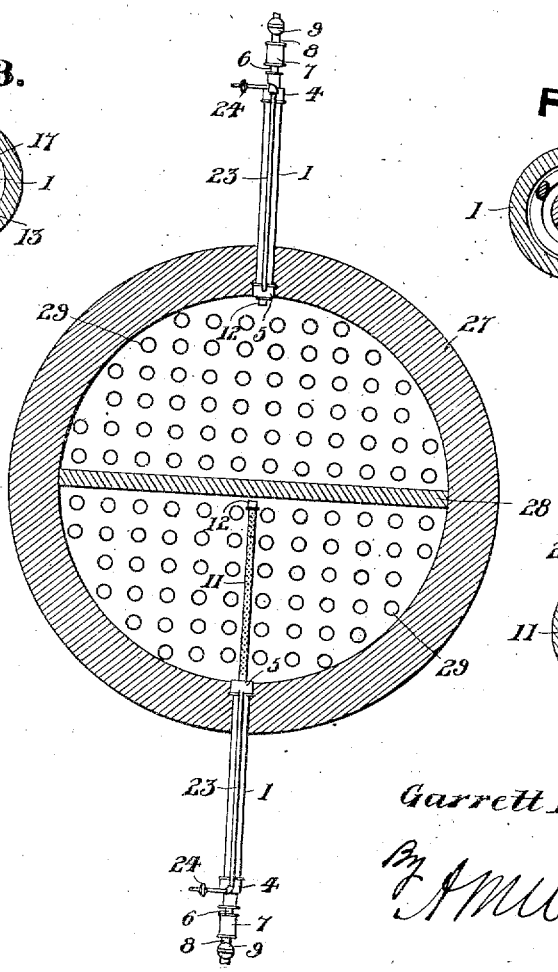
Figure 5:
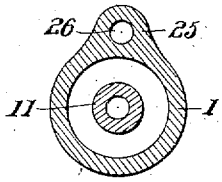

Figure 1 is a longitudinal sectional view of the preferred form of cleaner, partly broken away; Fig. 2 is a side elevation of a modified form of cleaner, partly broken away and partly in section; Fig. 3 is a cross-sectional view taken on the line III—III of Fig. 1; Fig. 4 is a similar view taken on the line IV—IV of Fig. 1; Fig. 5 is a similar view taken on the line V—V of Fig. 2; and Fig. 6 is a horizontal sectional view of a vertical boiler provided with cleaners in accordance with this invention, one of the cleaners being shown with the distributing pipe or member in extended operative position, and the other cleaner being shown with said member in retracted position.

A cleaner in accordance with my invention comprises a tubular body or cylinder 1 having the ends thereof exteriorly screw-threaded, as at 2 and 3, to receive a reduction nipple 4 and a cap 5. The reduction nipple 4 has a short connection 6 with a T 7, which is connected to a steam supply pipe 8 provided with a controlling valve 9. The T 7 also constitutes a drain for the tubular body or cylinder 1.

The cap 5 has a concentric opening 10 and reciprocal in said opening is a perforated or apertured fluid distributing pipe or member 11. This member is arranged longitudinally of the body or cylinder 1 and the outer end thereof is closed as by a cap 12. The inner end of the member 11 is connected to a hollow piston head 13 provided with packing rings 14. Within the hollow piston 13 is a valve seat 15 for a valve 16, said valve having the stem 17 extending through a spider 18 within the hollow piston. The end of the valve stem 17 has a head 19 and encircling said valve stem, between the head 19 and the spider 18 is a coiled compression spring 20 that holds the valve 16 normally seated. In the body or cylinder 1, adjacent the cap 5, is a coiled spring 21 that encircles the member 11 and cushions a reciprocal movement of the member 11 when impinged by the piston 13. The cap 5 has a connection 22 with a steam or other fluid supply pipe 23 and said pipe is provided with an ordinary valve 24 for controlling the admission of steam to the body or cylinder 1.

In Figs. 2 and 5 of the drawings, there is illustrated a slight modification of the invention, wherein the cleaner body or cylinder 1 has a longitudinal enlargement 25 provided with a by-pass 26 serving functionally the same purpose as the steam supply pipe 23 and the connection 22.

A vertical boiler of the Wickes type is illustrated in Fig. 6, the boiler setting being designated 27, said boiler having a baffle 28 and flues 29. The cleaners are permanently mounted in the boiler setting, being so positioned that the fluid distributing pipes or members 11 will enter, when projected, between two rows of tubes 29.

When steam or other fluid is admitted to a cleaner body or cylinder the piston 13 is moved toward the inner end of the cleaner body or cylinder, thereby projecting the fluid-distributing member 11. Simultaneous with this operation the steam or other fluid under pressure, unseats the valve 16 and the fluid is admitted through the passage in the piston to the member 11 and discharged through the perforations or apertures thereof among the tubes of the boiler. The inward movement of the member 11 is cushioned by the spring 21 and after the flues 29 of the boiler have been blown and thoroughly cleaned, the supply of steam to the cleaner body or cylinder 1 is shut off and the supply admitted to the inner end of the body or cylinder 1 through the medium of the pipe 23. The fluid under pressure then retracts the fluid distributing member 11 and restores the same to normal position, the steam entrapped in back of the piston 7 when the valve 9 was closed cushioning the piston in its return movement.

The fluid distributing member of each cleaner being withdrawn from the heat zone of the fire chamber and housed within the body or cylinder when not in use and in no wise subjected to the heat in this position is consequently fully protected from burning out, and the cleaner or cleaners being fixed in the boiler setting are ready for use at any time desired, and require no shutting down of the boiler for operation. The distributing pipe being perforated on all sides, projects the cleaning fluid radially of the pipe in all directions to effect a thorough cleansing of all the tubes.

The preferred embodiments have been illustrated, but it is to be understood that the structural elements are susceptible to such modifications and variations as fall within the scope of the appended claims.

What I claim is:—

1. In a cleaner for boilers, a cylinder, a hollow piston reciprocal therein and having open ends, a check valve in the outer end of said piston and opening directly into said piston, a perforated fluid distributing member concentric with said cylinder and connected to the inner end of said piston and adapted to be projected from the inner end of said cylinder, means in the inner end of said cylinder and encircling said member for cushioning the movement of said piston in one direction, a fluid supply pipe connected to the outer end of said cylinder adapted to admit cleaning fluid to the cylinder, and a fluid supply communicating with the inner end of said cylinder to admit fluid thereto whereby said piston is restored to normal position.

2. In a cleaner for boilers, a cylinder, a hollow piston reciprocal therein and having open ends, a check valve at the outer end of said piston and opening directly into said piston, a perforated fluid distributing member concentric with said cylinder and connected to the inner end of said piston and adapted to be projected from the inner end of said cylinder, means in the inner end of said cylinder for cushioning the movement of said piston in one direction, a fluid supply connected to the outer end of said cylinder adapted to admit fluid thereto, and a fluid supply communicating with the inner end of said cylinder to admit fluid thereto whereby said piston is restored to normal position.

3. In a tube cleaner for boilers, a body adapted for mounting in a boiler setting and constituting a cylinder, a hollow piston reciprocable therein and having open ends, a check valve in said piston adapted to open inwardly of the piston toward the inner end thereof, a fluid distributing pipe connected to the inner end of the piston and provided circumferentially with fluid outlets, said pipe being concentric with said cylinder and adapted to be projected from the inner end of the cylinder, a fluid supply pipe connected with the outer end of the cylinder in back of the piston for moving the latter inwardly and projecting the distributing pipe and also supplying the latter with cleansing fluid, and a fluid supply communicating with the cylinder near the inner end thereof for moving the piston outwardly and retracting the distributing pipe.

4. In a tube cleaner for boilers, a body adapted for mounting in a boiler setting and constituting a cylinder, a hollow piston reciprocable therein and having open ends, a check valve in said piston adapted to open inwardly of the piston toward the inner end thereof, a fluid distributing pipe connected to the inner end of the piston and provided circumferentially with fluid outlets, said pipe being concentric with said cylinder and adapted to be projected from the inner end at the cylinder, a fluid supply pipe connected with the outer end of the cylinder in back of the piston for moving the latter inwardly and projecting the distributing pipe and also supplying the latter with cleansing fluid, a fluid supply communicating with the cylinder near the inner end thereof for moving the piston outwardly and retracting the distributing pipe, and means for cushioning the piston as it approaches the limit of its inward movement.

5. In a tube cleaner for boilers, a body constituting a cylinder adapted for mounting in a boiler setting, a hollow piston reciprocable within the cylinder having open ends and an interior valve seat, a valve within the piston engaging said seat and adapted to move toward the inner end of the piston in its unseating movement, means for supplying fluid to the opposite ends of said cylinder, and a fluid distributing pipe carried by the inner end of the piston for projection through and beyond the inner end of the cylinder as the piston is moved inwardly, said pipe provided with a plurality of fluid outlets.

6. In a tube cleaner for boilers, a body constituting a cylinder adapted for mounting in a boiler setting, a hollow piston reciprocable within the cylinder having open ends and a valve seat, a valve carried by the piston engaging said seat and openable toward the inner end of the cylinder, means normally tending to hold said valve seated, means for supplying fluid to the opposite ends of said cylinder for reciprocating the piston therein, and a fluid distributing pipe carried by the inner end of the piston and extending through the inner end of the cylinder, said distributing pipe being closed at its outer end and having a plurality of fluid outlets throughout its length.

7. In a tube cleaner for boilers, a body constituting a cylinder adapted for mounting in a boiler setting, a piston reciprocable therein and having a passage therethrough, a valve controlling said passage, means for supplying fluid to the cylinder at opposite ends of the piston to reciprocate the latter, and a fluid distributing pipe carried by the inner end of the piston in open communication with the passage in the piston, said pipe provided with a plurality of fluid outlets and being projected beyond the inner end of the cylinder as the piston moves inwardly and retracted as the piston moves outwardly.

8. In a cleaner for boilers, a cylinder, a hollow piston reciprocal therein and having open ends, a check valve in the outer end of said piston and opening directly into said piston, a perforated fluid distributing member concentric with said cylinder and connected to the inner end of said piston and adapted to be projected from the inner end of said cylinder, means in the inner end of said cylinder and encircling said member for cushioning the movement of said piston in one direction, a nipple on the outer end of said cylinder adapted to admit steam thereto, and an enlargement longitudinally of said cylinder provided with a by pass communicating with the inner end of said cylinder to admit steam thereto whereby said piston is restored to normal position.

9. In a cleaner for boilers, a cylinder, a hollow piston reciprocal therein and having open ends, a check valve at the outer end of said piston and opening directly into said piston, a perforated fluid distributing member concentric with said cylinder and connected to the inner end of said piston and adapted to be projected from the inner end of said cylinder, means in the inner end of said cylinder for cushioning a movement of said piston in one direction, a nipple on the outer end of said cylinder adapted to admit steam thereto, and an enlargement longitudinally of said cylinder provided with a by pass communicating with the inner end of said cylinder to admit steam thereto whereby said piston is restored to normal position, the bypass of said enlargement having the outer end thereof offset to provide clearance for said nipple.

In testimony whereof, I affix my signature in the presence of two witnesses.

GARRETT BURGESS.

Witnesses:
WM. L. HEGLIN,
JAS. F. HENDERSON.